Figure 1:
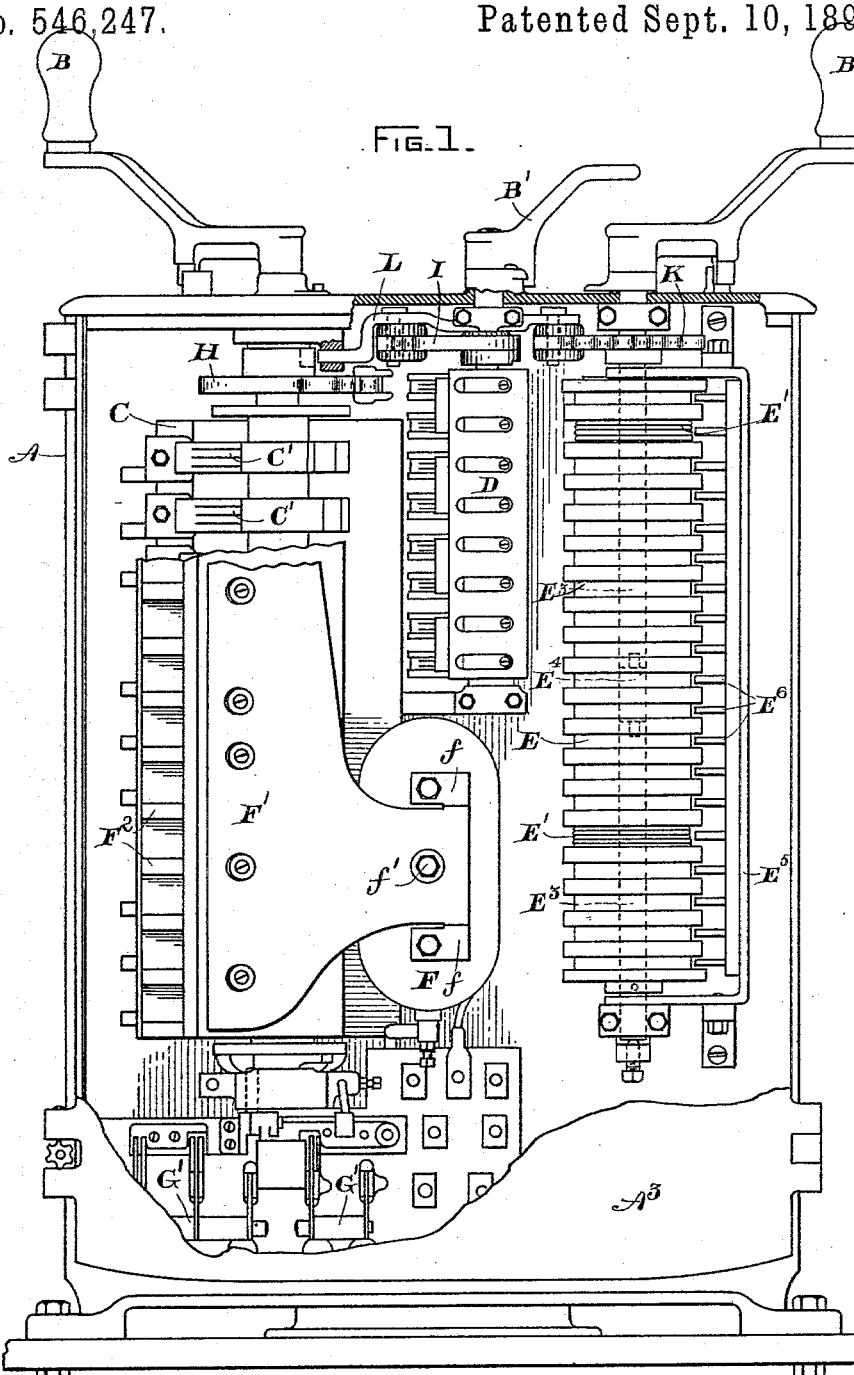

(No Model.) 6 Sheets—Sheet 2.
W. B. POTTER.
ELECTRIC BRAKE.
No. 546,247. Patented Sept. 10, 1895.
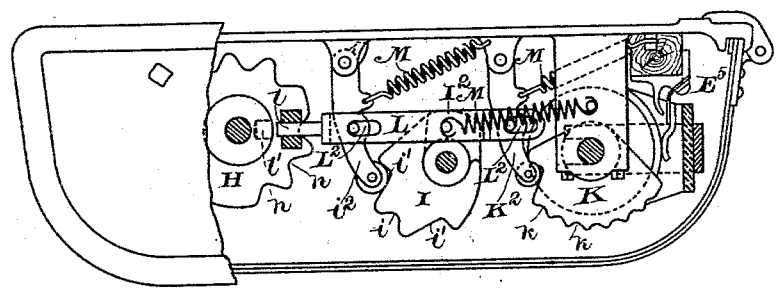
FIG. 2.
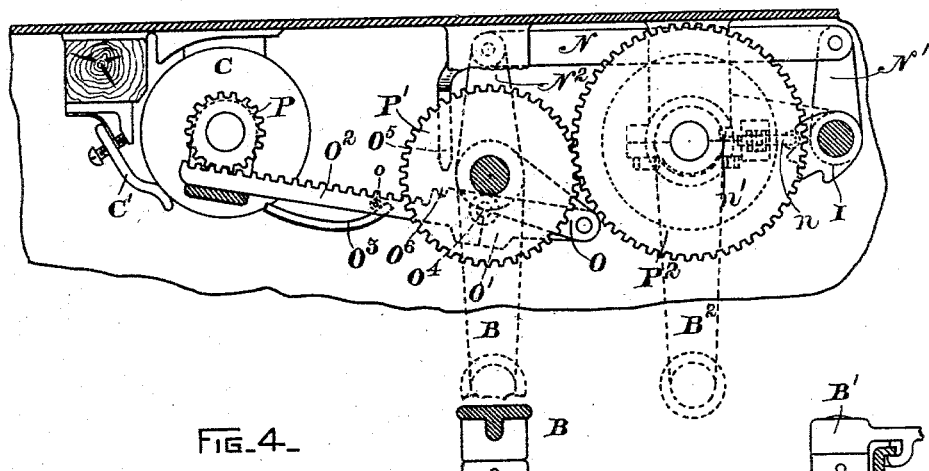
FIG. 3.
FIG. 4.
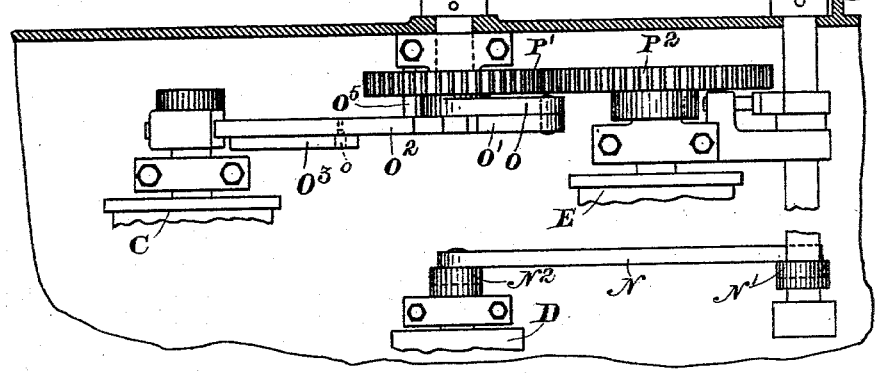
FIG. 5.
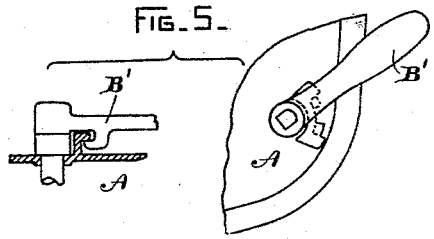
WITNESSES
A. F. Macdonald.
R. B. Hill.
INVENTOR
William B. Potter,
by Geo. R. Blodgett,
Atty.

(No Model.)  6 Sheets—Sheet 3.
W. B. POTTER.
ELECTRIC BRAKE.
No. 546,247.  Patented Sept. 10, 1895.
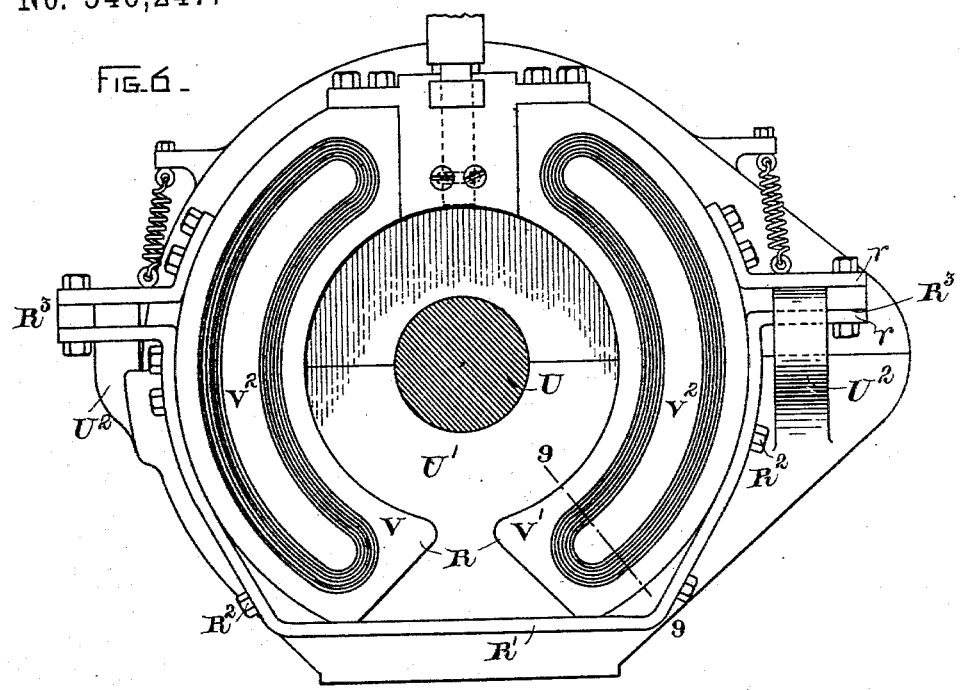
FIG. 6.
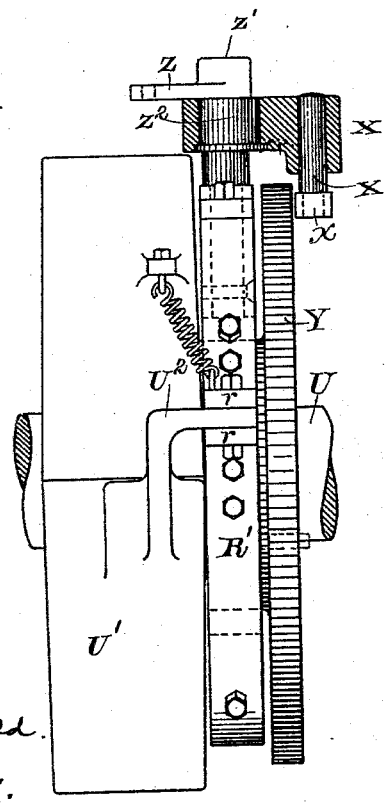
FIG. 7.
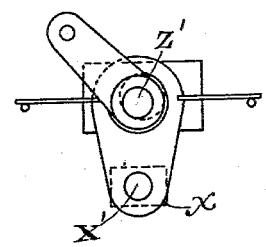
FIG. 9.
FIG. 8.
WITNESSES.
A. F. Macdonald.
B. B. Hill.
INVENTOR.
William B. Potter, by
Geo. R. Blodgett.
Atty.

(No Model.) 6 Sheets—Sheet 4.

W. B. POTTER.
ELECTRIC BRAKE.

No. 546,247. Patented Sept. 10, 1895.

WITNESSES_
A. F. Macdonald.
D. B. Hull.

INVENTOR_
William B. Potter,
by Geo. R. Blodgett,
atty.

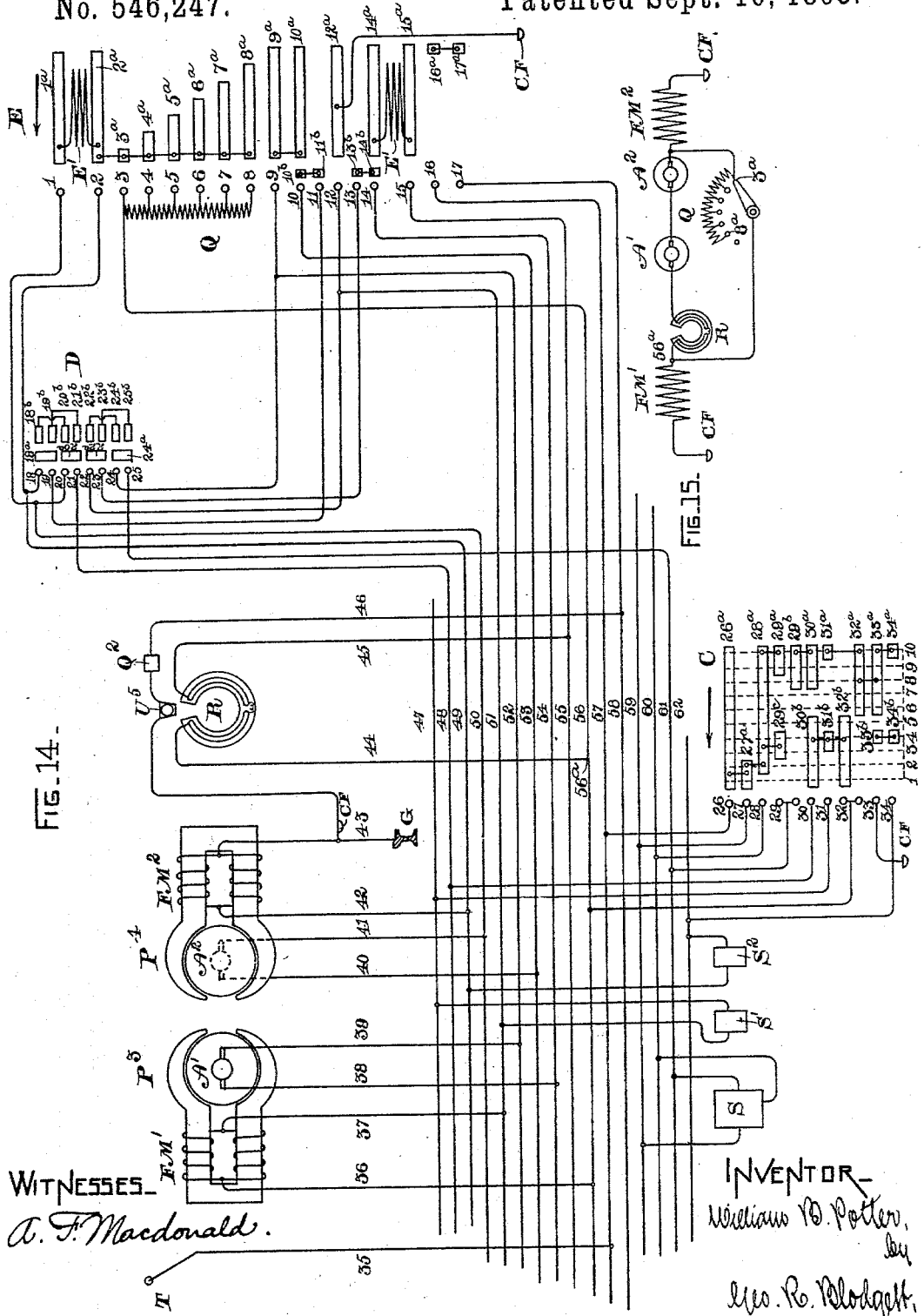

(No Model.) 6 Sheets—Sheet 6.
W. B. POTTER.
ELECTRIC BRAKE.
No. 546,247. Patented Sept. 10, 1895.
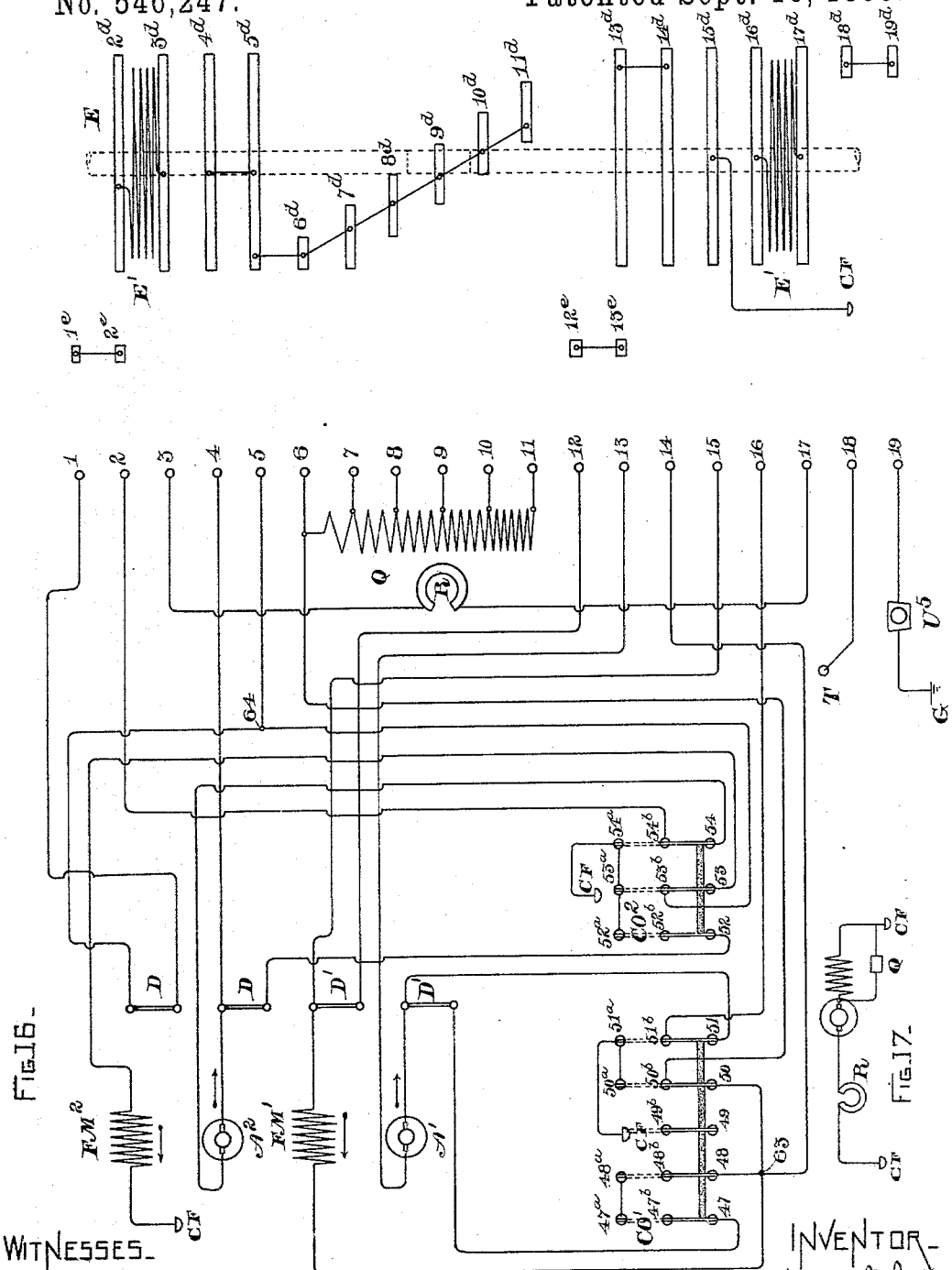
WITNESSES
A. F. Macdonald.
B. B. Hull.
INVENTOR
William B. Potter,
by
Geo. R. Blodgett
Atty.

UNITED STATES PATENT OFFICE.

WILLIAM B. POTTER, OF SCHENECTADY, NEW YORK, ASSIGNOR, BY MESNE ASSIGNMENTS, TO THE GENERAL ELECTRIC COMPANY, OF NEW YORK.

ELECTRIC BRAKE.

SPECIFICATION forming part of Letters Patent No. 546,247, dated September 10, 1895.

Application filed January 19, 1895. Serial No. 535,430. (No model.)

*To all whom it may concern:*

Be it known that I, WILLIAM B. POTTER, a citizen of the United States, residing at Schenectady, in the county of Schenectady, State of New York, have invented certain new and useful Improvements in Electric Brakes, of which the following is a specification.

My invention relates to electrically-operated brakes for moving mechanism, and more especially for mechanism propelled by electric motors, in which the motors may be, in ways well understood in the art, converted into generators driven by the momentum of the moving mass. The current from the motors may then be utilized to operate brake-shoes of one form or another, which, in conjunction with the magnetic resistance to the passage of the armature-conductors through the field of force, will operate to quickly arrest the motion of the car or other apparatus to which the motors are attached. Many forms of brake of the class described have been devised, some of which are efficient and some not. In most of such forms with which I am acquainted a single handle has been used for operating both a motor-controller of one type or another and the braking mechanism. This, however, I believe to be not an advantageous disposition of the operating parts of the apparatus, as I have found by practical experience that where two or more motions are given to a single handle the operator is apt, in a moment of excitement, to give the handle the wrong movement, and thus increase the liability to accident instead of stopping the car. To avoid this trouble I have, therefore, arranged my mechanism with three operating-handles, one for the motor-controller (which is preferably of the now well-known series-parallel type—such, for instance, as that described in my Patent No. 524,396, issued August 14, 1894,) and another for the electric-braking mechanism. In conjunction with these I employ the usual reversing-switch for the motors, which, however, has no part in the operation of the braking mechanism except that it answers the same purpose in relation to the brake-switch that it does to the controlling-switch—that is, as applied to the power it renders it possible to run either forward or backward—and as the brake-switch needs to reverse the motor connections in order to be operative the action of the reversing-switch is such that the brake operates in either direction. I thus have upon the controlling-stand three operating-handles. To prevent any accident by improper manipulation of the handles, I may and preferably do arrange within the stand interlocking mechanism, presently to be more fully described, by which it becomes impossible to operate more than one of the handles at a time—that is to say, while operating the controller-handle the reversing-switch and the brake-handle are locked in position, while operating the brake-handle the reversing-switch and controller-handle are locked, and while operating the reversing-switch both the controller and the brake are locked. When the handles of the brake and controller are at the off position and the reversing-switch is at one of its two positions with the motors properly connected, it is possible to operate any one of the handles desired; but, as already pointed out, no two can be operated at any one time.

A modified form of my device will be more fully described in which I may employ gearing by means of which the rotation of the controlling-cylinder is gradually retarded as it approaches the off position, where it is to be stopped, so that its momentum does not give a hammer-blow to the stop. This gearing also permits me to so arrange the two co-operating handles of the controller—that is, the motor-controller handle and the brake-handle—that should the motorman, in a moment of excitement, attempt to apply the brake without shutting off the controller the operation of the brake-handle will bring the controller to its off position. In this arrangement I have upon the brake-cylinder a blank space over which the contacts may travel, and this cylinder is constantly in rotation except when the handle is idle. With this I also combine the usual reversing-switch and a lock actuated by this switch, so that, when this reversing-switch is in its intermediate position, all of the mechanism is locked against motion; only in this position is it possible to remove the handle of the reversing-switch. In either of the arrangements illustrated, when the handles are removed, as when the moterman goes to the other end of the car, the cylinders are locked in position and cannot be tampered with by unauthorized persons.

A further feature of my invention will be found in the peculiar construction of the brake-shoe which I have adopted. This consists, substantially, of a light truss, preferably of wrought-iron, having a pair of segmental castings supported within it. Within these segments I place the coils which are to energize the shoe, and by this arrangement I obtain, without great weight, a strong and substantial shoe which is capable of being readily replaced, if necessary, and in which worn parts can be easily renewed.

I also embrace within my invention a means for supporting the brake-shoe without adding to the equipment of the car. I have found this feature to be of very great importance, inasmuch as many forms of truck, when equipped with brakes of other constructions, require the addition of cross-bars or other devices for supporting the brake or preventing the rotation of the shoe. This has limited the usefulness of some forms of brake, which require special constructions, whereas by my improved method of support I am enabled to adapt my brake to any form of truck now upon the market. The support consists in placing the brake-shoe directly upon the gear-casing adjoining the motor or upon some part of the motor itself, for which purpose I provide upon the gear-casing or motor suitable lugs to take the strain. At the same time I support the weight of the shoe to a greater or less extent, as desired, upon springs which permit it to have a certain small amount of play and which also act not only to relieve the shoe and bring it away from the disk against which it bears when the brakes are released, but to lessen the friction of the shoe upon its bearings. For the former purpose I arrange the springs at a slight angle to the face of the disk and shoe, and attach them, also, to the gear-casing or motor. The attachment of the brake-shoe to the motor directly is of peculiar importance in the form of motor known as "gearless," in which the armature is supported upon a sleeve surrounding the axle, inasmuch as in this form of apparatus the amount of room between the vehicle-wheel and the armature is extremely limited.

My invention further consists in an improved magnetic blow-out for the braking-cylinder, which consists in connecting a coil directly between two of the contacts upon the cylinder, and thus energizing the shaft about which it turns as a pole-piece for the magnet. The iron frame supporting the arc-deflector forms a second pole, the magnetic field being between this iron and the shaft of the cylinder. The yoke-piece of this magnetic circuit is that part of the deflector-frame which turns over the end of the cylinder and embraces the shaft, while the controller-frame itself assists the magnetic action. I may also divide the shaft just referred to by a piece of non-magnetic metal and duplicate the coil, so that where I employ cut-out switches, as hereinafter referred to, the shaft and controller-frame may form a horseshoe-magnet, which will act with sufficient energy to extinguish any arc that may be formed.

My invention further consists in the combination, with the series-parallel controller to which I have referred, of certain cut-out switches permitting me to operate my improved electric brake with only one of the motors in circuit without materially affecting its efficiency.

Furthermore, my invention consists in a mechanical locking device by means of which when the brake-shoe and the disk against which it bears are brought into engagement by the operation of the electrical part of the apparatus and the car has been brought to a stop the shoe and disk are mechanically locked together and rotation is absolutely prevented. This I obtain by a mechanism acting upon the principle of the ring-clutch, normally held in a central or open position, but which is drawn up either by the action of the brake-controller at its last position or otherwise so as to just engage the brake-shoe and the braking-disk. If the disk (which is fast to the axle) then starts to rotate, it engages with one side of the clutch and draws it forward, dragging against the brake-shoe and effectually locking the two together. As it would be disastrous to the apparatus to allow such an absolute lock to be put on while it is in motion, I control its operation by and preferably arrange it to be operated by the same handle as the electric brake, and inasmuch as there is always more than enough power in the electric brake to lock the wheels when necessary it is evident that by arranging the lock to come on when the brake-handle passes its last position any risk of its being applied while the wheels are still rotating is obviated. For this I may substitute or with it I may combine a magnetic locking arrangement, consisting of a coil located in or upon the brake-shoe and directly in the circuit from the trolley to the ground, which is brought into action by the last step of the brake-handle, so that after the car is brought to rest this coil in conjunction with the friction of quiescence will be sufficient to keep the car at rest. The coil is usually of high resistance.

In conclusion, my invention consists in sundry details of improved construction which will be more fully described hereinafter and specifically pointed out in the claims annexed to this specification.

In the accompanying drawings, hereby referred to and made part of this specification, like letters and numerals refer to like parts throughout, and therein—

Figure 1 is a front elevation, partly in section and partly broken away, of my improved controlling-stand adapted to the purposes of my invention. Fig. 2 is a plan view, also partly in section and partly broken away, of the interlocking arrangements to which I have referred. Fig. 3 is a similar view of the modification referred to in my statement of invention employing a single handle for the controller and the brake-cylinder. Fig. 4 is a front elevation of the parts shown in Fig. 3. Fig. 5 is a detail of the lock on the reversing-switch. Figs. 6 and 7 are a side elevation and end elevation, respectively, of the improved support for the brake-shoe which I have devised, and also illustrate the mechanical locking mechanism already referred to. Fig. 8 is a detail of the mechanical lock, showing it in plan with the means for effecting its release. Fig. 9 is a section on line 9 9 of Fig. 6 of the cast part of the brake-shoe which I employ. Figs. 10 to 13 show the connection of the mechanical lock and the brake-switch cylinder. Fig. 14 is a diagram illustrating the circuits upon an electric car with my invention applied thereto. Fig. 15 is a diagram showing in simple form the arrangement of the circuits. Fig. 16 is a diagram showing the combination of my improved brake with cut-out switches adapted to permit of its operation when either one of the motors is cut out, and Fig. 17 is a diagram illustrating the motor combinations of the last figure.

I will first describe the mechanical construction as illustrated in Figs. 1 to 13, and will then take up and describe the electrical actions as illustrated diagrammatically in the other figures of the drawings.

Referring by letter, in Fig. 1 A is the frame of the controller. B B' B² are the operating-handles. A portion of the cover is shown at $A^3$. C is the controlling-cylinder, the contacts and cross connections of which are illustrated in Fig. 14. The particular apparatus described is not claimed herein, it being shown and described in my patent above referred to. C' C', &c., are the fixed contacts co-operating with the sliding contacts upon the cylinder C. D is the reversing-switch, the electrical connections of which are shown in Fig. 14. E is a brake-cylinder or braking-switch provided, as are the other cylinders, with the usual contacts. The shaft of this switch, as shown in dotted lines, is divided into three portions $E^3$, $E^3$, and $E^4$. The portions $E^3$ $E^3$ are of iron or steel, while $E^4$ is of brass or other non-magnetic metal. As pointed out in my statement of invention, the object of this division is to make the shaft and the yoke $E^5$, supporting the arc-deflectors $E^6$ $E^6$, form a magnet of sufficient strength to blow out any arc that may be formed upon the cylinder-contacts. The pole-pieces $E^3$ $E^3$ are energized by the coils E' E'. These coils are wound directly upon the surface of the cylinder and are connected, as illustrated in Fig. 14, between those contacts which are last in circuit, so that they may be energized at all times or substantially at all times. F is the blow-out magnet-coil of the main controller-cylinder, and F' is the pole-piece carrying the arc-deflectors $F^2$ $F^2$. This pole-piece is mounted in bearings $f f$, and is secured in position by the lag-screw $f'$, as illustrated in my patent above referred to. G' G' are the cut-out switches customarily employed with a series-multiple controller. The fixed contacts or fingers co-operating with the cylinder E are not illustrated, they being at the side of the cylinder.

Referring now to Fig. 2 in connection with Fig. 1, I illustrate the interlocking arrangements to which I have referred. Therein H is a star-wheel co-operating with a cam-roller, (not illustrated,) the wheel being affixed to the controller-cylinder C. This serves to give the usual step-by-step motion to the cylinder. The notches $h$ $h$ are designed for the reception of the cam-roller. L is a bolt provided with an end $l$, adapted to fit into the notch or stop $l'$ upon the controlling-cylinder. Attached to the reversing-cylinder is a cam I, provided with notches $i$ $i'$ $i'$. A pawl $i^2$, having a cam-roller upon its end, co-operates with the cam I. The back of the cam I, as illustrated in dotted lines at $I^2$, is formed to afford a stop or lock for a pawl $K^2$, also presently to be again referred to. These two pawls $K^2$ and $i^2$ have pins projecting into slots $L^2$ $L^2$ upon the bolt L. Attached to the brake-cylinder is a star-wheel K, provided with notches $k$ $k$, &c., in which the cam-roller upon the pawl $K^2$ operates. Suitable springs M M M draw back the pawls $i^2$ and $K^2$ and the bolt L.

The operation of the parts described is as follows: When the controller-cylinder C is rotated the cam or star wheel H rotates with it, and the notch $l'$ is out of alignment with the end $l$ of the bolt L. It is then impossible to actuate the reversing-switch, because the pawl $i^2$ locks the cam I in position. It is also impossible to actuate the brake-switch, because the pawl $K^2$ locks the cam K in position, both of these pawls being held by the slots $L^2$ $L^2$ in the bolt L, the end $l$ of which no longer registers with the notch or stop $l'$, so that the bolt itself cannot move. When the controller-handle is at the off position, either of the handles B' B² may be actuated. Assume now that the reversing-switch handle B' is actuated. As soon as the notch $i$ engages with the roller upon the pawl $i^2$ the bolt L is thrown forward into the notch $l'$, thus locking the controller-cylinder, while the part $I^2$ of the cam I engages with the pawl $K^2$ and locks the brake-cylinder in place. As soon, however, as the pawl $i^2$ drops into either one of the notches $i'$ $i'$ the parts are again free to move. Similarly, if the handle B² be actuated the cam K forces forward the pawl $K^2$, thrusts the end $l$ of the lever L into the notch $l'$, thus locking the controller-cylinder, and the pawl $K^2$ itself approaches so close to the part $I^2$ of the cam I that the reversing-switch cylinder cannot be rotated sufficiently in either direction to actuate its contacts.

Referring now to Figs. 3 and 4, I illustrate the modification referred to in my statement of invention by which the brake-handle may be made to return the controlling-switch to the off position before it operates the braking-cylinder. Therein, as before, C is the controlling-cylinder, and E is the braking-cylinder. Upon the controlling-cylinder is mounted a pinion P co-operating with a rack $O^2$. Attached to a gear P' is a crank O and a connecting-rod O', jointed at $O^4$ to the rack $O^2$. Upon the under side of the rack is a guide-roller $o$ co-operating with the guide $O^3$. Meshing with a gear $P^2$ operating the braking switch-cylinder is the other gear P', referred to above. At $O^5$ is a stop co-operating with a notch $O^6$ upon the rack $O^2$. D is the reversing-switch cylinder, which in the case illustrated is operated by levers N N' $N^2$. The cam I in this case is situated upon the shaft of the handle B' instead of upon the cylinder-shaft, the construction being otherwise unchanged. The bolt $n$ co-operates with the notch $n'$ upon the brake-cylinder, which is geared to the controlling-switch, and, as before, when the handle B' is operated the bolt $n$ is thrust into the notch $n'$ and the whole apparatus is locked. The handle B' may then be removed and it will be impossible to operate the controller until the cam I is thrown to one side of its central position. When the apparatus is free to turn, however, the rotation of the handles B $B^2$ (shown in dotted lines in the figure) operates the gears P' $P^2$, and when the handle B is carried to the left will rotate the controller-cylinder C in the usual way by the rack $O^2$ and the pinion P. When the handle, however, is carried to the right, the controller-cylinder C will be rotated by the rack and pinion until the notch $O^6$ upon the rack strikes the stop $O^5$, when this cylinder will cease to rotate. As will be observed from a study of the drawings, the motion of the rack longitudinally becomes less and less, the more nearly it gets into alignment with the crank-arm O, operating it when the two are at a right angle the motion of the rack being the most rapid. This, as pointed out in my statement of invention, retards the cylinder C, so that when the notch $O^6$ finally strikes the stop the momentum of the cylinder has been very much checked and the blow is not as severe as it would otherwise be. During the time that this cylinder is rotated the cylinder E is also, of course, being rotated; but during this part of its rotation the fixed contacts bear upon the insulating or idle portion of the cylinder. When the notch $O^6$, however, strikes the stop and the controller-cylinder C is brought to its off position, the connections, as more fully described hereinafter, are made between the fixed contacts and the contact plates or strips upon the cylinder effecting the braking combinations. The further rotation of the handle B to the right actuates the brake in the usual way, the crank O and the connecting-rod O' being free to continue their motions by reason of the jointed connection $O^4$ with the rack $O^2$. It is of course manifest that this arrangement may be reversed and the controller-cylinder may bring the brake-cylinder to the off position, or I may arrange the controller-cylinder and the brake-cylinder to gear into each other by circular gears, or by such form of gearing (as an elliptical or figure 8) as will effect the reduction of speed of rotation in the way already described with reference to the rack and pinion. In case the two circular gears are used, however, this reduction of speed is not effected; but I may, if preferred, so arrange the apparatus and dispense with this feature without departing from the principles of my invention.

In the claims which I have addressed to this part of my invention, as herein described, I have used the term "controlling-switch" as applied to the cylindrical switch which I have illustrated as the embodiment of the invention. It is to be understood that this term is used by me as distinctive in the art of the structure to which it is applied, and I do not mean thereby a cut-out switch alone, the functions of a controlling-switch being not only to turn on and turn off current, but also to regulate in one way or another, as by rheostat or the series-parallel system of control, the speed of the motors from rest to the highest speed for which they are designed, and it is with this meaning that I have used the term in my claims.

Figs. 6 to 9 show both the improved form of brake-shoe which I have devised and also the method of mounting it, heretofore briefly referred to. Therein U is the car-axle. U' is the gear-case of the motor, and R is, as in the other figures, the brake-shoe. In the other figures I have illustrated this shoe diagrammatically in a form now well known; but the present figure shows that which I prefer, and in that R' is a frame, preferably of wrought-iron, and V V' are segmental castings provided with coil-chambers $v$ $v$ and interior cores $v^2$. The frame R' is secured to these segments by bolts $R^2$.

Referring to the same figures, the attachment of the shoe to the gear-casing is illustrated at $R^3$. $U^2$ $U^2$ are lugs cast upon the gear-case, and $r$ $r$ are parts of the frame already referred to, which are secured to the castings V V' at a little distance apart, so as to permit the lug $U^2$ to make just a working fit between them.

In the same figures, taken in conjunction with Figs. 8 and 10 to 13, I show at X the locking device, to which I have already referred. Therein Z is a lever carrying an eccentric $Z^2$ upon a shaft Z', mounted in the top of the brake-shoe. X' is a removable pin secured in the lug X. As the principal wear of the lock comes upon this pin, it is made removable, so that a new bearing may be provided at any time, the head $x$ being also removable for this purpose. R is, as before, the brake-shoe, of which the frame R' is shown in Fig. 7, and Y is a disk fast upon the axle. As illustrated, the face of the brake-shoe and the disk are closely approximated, and when the current is turned on in the coils occupying the coil-chambers $v$ $v$ the brake-shoe becomes strongly magnetic and attracts the disk, which, being fast to the axle, acts to draw the brake-shoe toward it, the parts $r$ $r$ sliding upon the lugs $U^2$. The friction of the disk and the brake-shoe, in conjunction with the resistance to rotation of the motor-armatures, soon stops the car. Just at this moment the lock is thrown on by the motorman by suitable mechanism drawing the shaft $Z'$, carrying the eccentric, around upon its axis and bringing up the lug X and the bearing $x$ of the bolt $X'$ against the disk Y. When the magnetic attraction dies away, (which, however, takes some time, inasmuch as the brake as a whole becomes somewhat like a transformer and the magnetism in dying out sets up new currents in the disk and shoe, thus tending to prolong the magnetic field,) then the shoe and disk are still held in close engagement by the lug X and upon any tendency to rotate [this engagement is made still closer, as the part $x$ is drawn around in the direction of rotation by the disk Y and is thus brought up firmly against the brake-shoe, its operation being like that of the well-known ring-clutch in electric-arc lamps and other devices. The parts just described are also illustrated in another view in Fig. 8, from which the action just pointed out will be rendered more clear.

Figure 10:
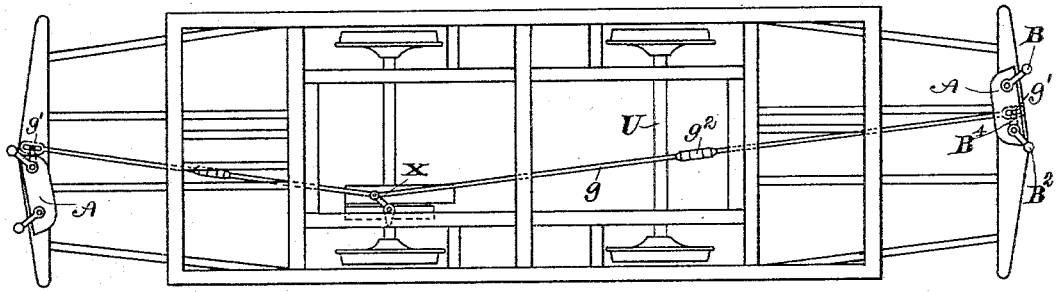
Figure 11:
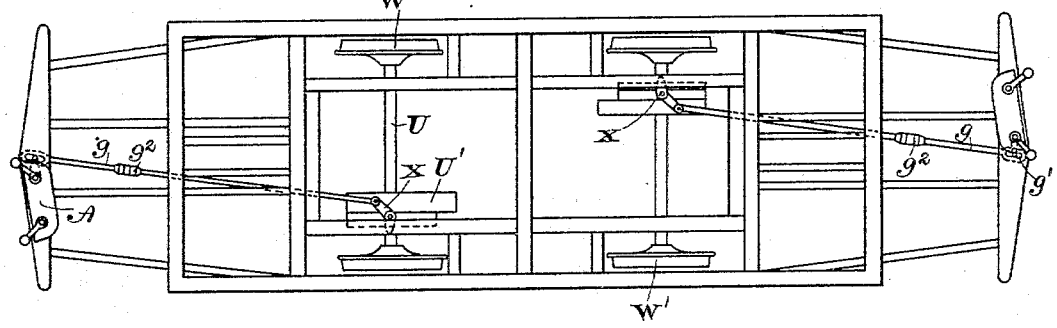

Referring now to Figs. 10 and 11, I show the application to a car of the mechanical lock which I have devised, with the means connected with the controller adapted to prevent the operation of the lock until the brake is fully set. As already pointed out in my statement of invention, it is necessary that the wheels should be locked, or moving at so slow a rate as to be practically locked, before the actual mechanical locking occurs. Otherwise— that is, if the movement be at too great a rate of speed—the absolute locking of the disk and brake-shoe may cause injury to the apparatus. In these figures X is, as before, the lock. U is the car-axle, $W'$ the wheels, and $U'$ the gear-case of the motors. Connecting the lock with the braking-switch is a rod $g$, provided with a turnbuckle $g^2$ for taking up the slack in the rod. As illustrated in Fig. 10, only one lock is employed, adapted to be set from both ends of the car. Ordinarily this will be quite sufficient. A is, as before, the controller-case, and B the controller-handle, $B^2$ being the handle of the braking-switch. The shaft of the braking-switch extends, as will be readily understood, through the cylinder and through the platform of the car. To the bottom of this shaft is attached a crank $B^4$, and a pin on this crank operates in the slotted end $g'$ of the rod $g$. As illustrated, it will be seen that there is a certain amount of lost motion in this slotted end, so that the braking-switch handle $B^2$ may be turned for a definite distance before the lock is actuated. Thus the brake will be fully set and the wheels will have ceased to turn before the lock is put on. The arrangement shown in Fig. 11 is substantially like that in Fig. 10, except that a lock is provided for each axle and each controller operates its own lock. It is manifest that the two locks may be connected, if desired, and each controller operate them both; but as this is merely a mechanical feature it will not be further illustrated or described. It is further manifest that it is immaterial whether the lock be operated by compression upon the rod $g$ or extension thereof, as this may be accomplished merely by turning the arm $B^4$ upon the shaft into one or another position, as may be required. For instance, in the right-hand controller of Fig. 10 the rod is operated by extension, while in the left-hand controller it is operated by compression.

Figure 12:
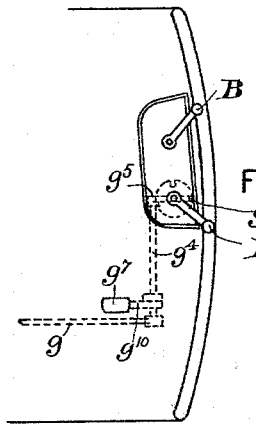
Figure 13:
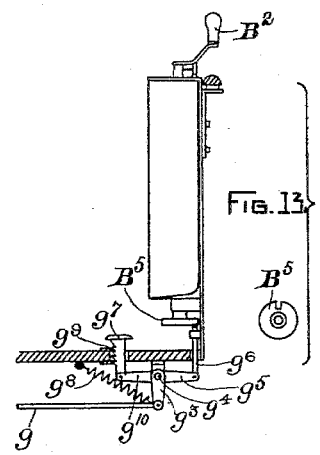

In Figs. 12 and 13 I illustrate a modification which may be employed and still be within my invention. In this modification a treadle is so arranged that it can only be operated after the braking-switch cylinder has been turned to its last position, a stop upon the treadle co-operating with a notched disk or "tumbler" upon the braking-switch, and the notch being in alignment with the stop only in the last position of the switch. In these figures, $g$ is, as before, the rod leading to the lock, the other parts being the same as in Figs. 10 and 11. $g^3$ is a crank affixed to the shaft $g^4$ and operating the rod $g$. $g^5$ is another crank also affixed to the shaft $g^4$ and operating the stop $g^6$, which co-operates with the notched disk or tumbler $B^5$, separately illustrated in Fig. 13. A treadle $g^7$ projects above the car-platform. $g^8$ is a relieving or centralizing spring adapted to assist the centralizing-springs upon the lock proper, as illustrated in Fig. 8. This spring may be omitted if desired. One side of the treadle-post is provided with teeth co-operating with the fixed pawl $g^9$ upon the platform. A lever $g^{10}$ connects the treadle $g^7$ with the shaft $g^4$. The operation of the parts described is apparent—that is to say, when the notch in the disk $B^5$ is opposite the stop $g^6$ the treadle $g^7$ may be depressed and the teeth will engage with the pawl $g^9$. A slight amount of lost motion is left in the opening through which the treadle-post passes, and when it is desired to disengage the teeth from the pawl the treadle is merely pressed forward, and the spring $g^8$, in conjunction with the springs upon the lock proper, will raise it and release the stop and lock. It will be readily understood that this arrangement affords not only a safety provision against putting on the lock when the brake is not in its last position, but also prevents the brake being thrown off or the power applied until the lock has been released, as the stop $g^6$ prevents the rotation of the handle $B^2$.

The arrangement of circuits which I illustrate in Fig. 14 has advantages in the saving of wire and of labor in car-wiring. It consists substantially in the combination of a series-parallel switch, (preferably such as that described in my patent above referred to,) a reversing-switch, which may be of any suitable form, and a braking-switch which I prefer to have of the form described, but which may be of other forms. The braking-switch is provided with a pair of auxiliary contacts, presently more fully described, through which circuits are made between the trolley and the motors through the series-parallel controlling switch. By the arrangement of these contacts I am enabled to save considerable wire, as above pointed out. The same letters are used in this as in the other figures, so far as they are applicable; but referring, further, by letter $P^3$ $P^4$ are the motors, of which $A'$ $A^2$ are the armatures and $FM'$ $FM^2$ the field-magnets, respectively. T is the trolley. R is, as before, the brake-shoe. $U^5$ is the auxiliary magnetic lock which may be employed. Some of the circuits are completed through the iron framework of the controlling stand, which I have indicated in appropriate places by the letters CF, indicating controller-frame. This controlling-frame is customarily connected to the ground-wire of the motors—that is, grounded upon the truck in some suitable way. From one controller-frame to the other, however, is a perfect metallic circuit, irrespective of the connection with the ground, which may be said in a sense to be merely an auxiliary safety connection. S $S'$ $S^2$ are the resistances employed in the running of the car in its ordinary course, while Q is, as before, the auxiliary resistance which I prefer to use to regulate the current flow in the brake-magnet when the motors are operated as generators.

When the motors are running the car, the first position is in series with all of the main resistance S in circuit, and in this position the course of the current is as follows: Entering by the trolley T it passes down the lead 35 to the lead 57, thence to the contact-brush 26 upon the controller C at the bottom of the figure, then to contact-plate $26^a$, thence by cross connection to contact-plate $27^a$, to contact 27, to lead 59, thence through the resistance S, going in this position through the entire resistance to the lead 61, following this lead to contact 25 upon the reversing-switch D in the upper right-hand part of the figure, thence to contact-plate $24^a$, thence to contact 24, thence by the lead 52 and lead 39 to the armature $A'$, thence through the armature by the lead 38 to lead 54, thence to contact 14 upon the brake-switch E, to contact-plate $14^b$, by cross connection to contact-plate $13^b$, then to contact 13, then to contact 23 upon the reversing-switch D, then to contact-plate $22^a$, then to contact 22, then to lead 51, to lead 37, through the field-magnet $FM'$ of the motor $P^3$, through the lead 36 to the lead 56, to contact 32, to contact-plate $32^b$, by cross connection to contact-plate $30^b$, to contact 30, to the lead 48, to contact 21 upon the reversing-switch D, to contact-plate $20^a$, to contact 20, to the lead 50, through the lead 41, through the armature $A^2$ of the motor $P^4$, through the lead 40, to the lead 53, to contact 10 upon the brake-switch E, to contact-plate $10^b$, by cross connection to contact-plate $11^b$, to contact 11, to contact 19 upon the reversing-switch D, to contact-plate $18^a$, to contact 18 by the lead 49, through the lead 42, through the field-magnet $FM^2$ of the motor $P^4$, and by the lead 43 to ground. As will be seen, this combination gives the resistance in series with the two motors, which are also in series. The other combinations are those briefly indicated in my patent above referred to, and as they form no further part of my invention herein than as the switch forms a part of the combination with the brake-switch I will not further describe them, particularly as some of these combinations are not of my sole invention. When it is desired, however, to operate the brake, then the trolley-circuit is cut off at the controller C and the brake is not in connection with the trolley-circuit until in the last position of the brake-switch, when the contacts 16 and 17 upon the brake-switch E are connected by the contact-plates $16^a$ and $17^a$, and current is sent through the lock $U^5$ to ground. The path through this lock (which consists of a high-resistance coil or coils in the brake-shoe) also includes a resistance $Q^2$ for the purpose of limiting the current. I do not further illustrate or describe the peculiar arrangement of the electric locking device which I prefer, nor do I claim it in this application, as it is shown and claimed in an application soon to be filed, and forming a division of this case. The operation of the brake is not dependent, however, upon the trolley-current in any sense. The first step in the rotation of the brake-switch when moved from its off position, in which the contacts 10, 11, 13, and 14 rest, respectively, upon the contact-plates $10^b$, $11^b$, $13^b$, $14^b$, serves to complete the local circuit with the motors in the way indicated diagrammatically in Fig. 15—that is to say, the two armatures and the brake-shoe are in series, the two field-magnets are also in series with the armatures, being connected through the controller-frame, and are in shunt to the resistance Q. It will be readily understood that at first the field-magnets are shunted by wire of extremely small resistance and that as progressive steps of the resistance Q are cut in these field-magnets take more and more current, and the current supplied to the brake-shoe R becomes larger and larger and of higher electromotive force. The circuits which effect this combination are as follows: starting from the armature $A^2$ and from the brush upon the left side of the armature, as indicated diagrammatically, the current would pass by the lead 40 to the lead 53, to the contact 10, contact-plate $10^a$, by cross-connection to contact-plate $9^a$, contact 9, to the lead 52, by the lead 39 to the armature A', through the armature, by the lead 38 to the lead 54, to contact 14, to contact-plate $14^a$, through the coil E' of the blow-out magnet acting as a cross-connection to the contact-plate $15^a$, to contact 15, to lead 55, through the brake-magnet R by the lead 45, and from the brake-magnet by the lead 44 to the lead 56. At the point $56^a$ the current divides, one path being by the lead 36, through the field-magnet FM' of the motor $P^3$, to the lead 37, to the lead 51, to contact 12, to contact-plate $12^a$, and to the controller-frame. Re-entering at the controller-frame, as indicated, through the lead 43 from the field-magnet $FM^2$, it passes through that field-magnet, by the lead 42 to the lead 49, thence to contact 2 upon the brake-switch cylinder, to contact-plate $2^a$, through the blow-out magnet coil E', the contact-plate $1^a$, to contact 1, to lead 50, and by the lead 41 to the other side of the armature, passing through which completes the local circuit. The other path from the point $56^a$, to which the current comes after passing through the brake-shoe, is in the opposite direction or to the right, through the lead 56, to the contact 3, and, in the first position of the switch E, to the contact-plate $3^a$, rejoining the other path of the current upon the contact-plate $2^a$. This is the shunt of practically no resistance, already referred to. It will be evident, however, that as the switch is rotated and the contacts 3 to 8 pass off the contact-plates $3^a$, $4^a$, &c., more and more of the resistance Q will be cut in, through which the current must pass before reaching any of the contact-plates, and then passing by the cross-connection to the contact-plate $2^a$, until finally, when the contact 8 leaves the contact-plate $8^a$, this shunt-circuit is opened and the entire current passes through the fields, as will be readily understood from an examination of the contacts and connections in Fig. 15.

Passing now to Fig. 16, I illustrate how my improved brake may be combined with the series-multiple controller, designed to effect the regulation of the motors in the way pointed out, and with cut-out switches, so that either one of the two motors preferably and usually employed in this method may be cut out, and still the brake-magnet coils will be supplied with current from the remaining machine, and the brake mechanism will not be disabled. In this diagram the same letters refer to the same parts as in previous figures, but in addition I show the cut-out switches CO' $CO^2$. These are preferably located in the usual places upon the series-parallel controller. I have indicated with short lines the usual connections of these switches in that controller and, as the operation in the ordinary use of the electric apparatus, as motors, is not modified by their use in this special combination, I do not further describe it in that relation. As the operation of the lock $U^5$ and the contacts 18 and 19 has been already described in connection with other figures, they will not be again referred to. So, also, the contact-plates $1^c$, $2^c$, $12^c$, and $13^c$, which serve to connect the brake-switch E with the controller, will not be further referred to. As represented, the motors act as generators upon a local circuit closed by the contacts 2 to 17, touching the contact-plates $2^d$, &c., upon the cylinder. Starting from the armature $A^2$ the current proceeds, in the direction indicated by the arrow, first to the contact 4, then to the contact-plate $4^d$, by cross-connection to the contact-plate $5^d$, to the contact 5, then to the point 64, then down the lead from the point 64 to the cut-out switch $CO^2$ at its contact $53^b$, then to the contact 53, then by the lead through the field-magnet $FM^2$ to the controller-frame, as shown in the upper left-hand corner of the diagram. Re-entering from the controller-frame, as indicated in the lower right-hand corner of the diagram, the current passes to the contact-plate $15^d$, then to the contact 15, then by the lead through the field-magnet FM', then to the point 63. From the point 63 two paths are open to the current—one by the lower lead to the contact 14, to the contact-plate $14^d$, by cross-connection to the contact-plate $13^d$, to the contact 13, to the armature A', passing through that armature, then by the lead to the cut-out switch CO', entering at the contact 51, then to the contact $51^b$, by the lead to the contact 16, contact-plate $16^d$, through the blow-out coil E', to the contact-plate $17^d$, then to the contact 17, then through the brake-magnet R to the contact 3, to the contact-plate $3^d$, through the blow-out magnet coil E', to the contact-plate $2^d$, to contact 2 by the lead to the cut-out switch $CO^2$ at the contact $54^b$, then to contact 54, and by the lead back to the armature $A^2$, thus completing the local circuit. The resistance Q is included in the other or shunt path from the point 63, as follows: Passing to the cut-out switch CO' at contact 50 the contact $50^b$, then by the lead to contact 6, to contact-plate $6^d$, to contact-plate $5^d$, to contact 5, to the point 64, then by the lead to the cut-out switch $CO^2$ at the contact $53^b$, then to contact 53, and then by the lead to the field-magnet $FM^2$, thus, as will be seen, shunting the resistance around the two fields FM' $FM^2$. As before, the rotation of the switch cuts in sections of resistance as the contacts 6 7 8, &c., pass from the contact-plates $6^d$ $7^d$, &c., until finally when the contact 11 passes from the contact-plate $11^d$ the shunt is opened and the entire current passes through the fields. Assume now that the cut-out switch CO' is thrown up until the lower contacts 47, 48, 49, 50, and 51 are open-circuited and the contacts $47^a$ $48^a$ $50^a$ $51^a$ are connected to the switch. This open-circuits the armature A' at the cut-out switch CO'. In this position the contacts 49 and $49^b$ will not be referred to, inasmuch as, as already pointed out, they have no office in connection with the brake, but only operate to cut out the electric apparatus when acting as motors, in a way well understood in the art. Following the lead from the right-hand side of the armature, it will be seen that as it passes through the reversing-switch D' (the reversing-switches being indicated diagrammatically at D D D' D' and having no office in the combination of circuits described in this figure) it passes to the contact 47 upon cut-out switch CO', and is there open-circuited, as the switch is in its upper or dotted-line position. Following now the lead to the right of the reversing-switch, it passes only as far as the contact 51 upon the same cut-out switch, and there it also is open-circuited. It is unnecessary to trace the connections to the other side of the armature, inasmuch as no current can flow in the open circuit.

The path of the current from the armature $A^2$, as modified when the armature A' is cut out, is as follows: Starting from the right side of the armature, as before, it passes by the lead to the contact 4, to contact-plate $4^d$, by cross-connection to contact-plate $5^d$, to contact 5, to the point 64, by the lead to the contact $53^b$ upon the cut-out switch $CO^2$, to contact 53, then by the lead through the field-magnet $FM^2$ to the controller-frame. Entering from the controller-frame to the cut-out switch CO', it passes to the contact $51^a$, then to the contact $51^b$, by the lead to the contact 16, to contact-plate $16^d$ upon the switch E, through the blow-out coil E' to the contact-plate $17^d$, to contact 17, through the brake-shoe R to the contact 3, to the contact-plate $3^d$, through the blow-out coil E' to the contact-plate $2^d$, to contact 2, to contact $54^b$ upon cut-out switch $CO^2$, to contact 54, and by the lead to the other side of the armature $A^2$, thus completing the local circuit through the field-magnet $FM^2$ and the brake-shoe R. The resistance is, as before, in shunt circuit around the field-magnet, and its circuit starts from the contact $51^a$ upon the cut-out switch CO', by cross-connection to contact $50^a$, to contact $50^b$, by the lead to the contact 6, to contact-plate $6^d$, by cross-connection to contact-plate $5^d$, to contact 5, to point 64, by the lead to contact $53^b$ upon the cut-out switch $CO^2$, thus rejoining the circuit at a point between the armature $A^2$ and the field-magnet $FM^2$. This circuit is illustrated diagrammatically in Fig. 17, which will be understood without further description. This Fig. 17 also illustrates, in substantially the same way the circuit when the cut-out switch $CO^2$ is thrown, as now to be described, the only difference being in the identity of the motor cut-out.

Assuming that the cut-out switch CO' is in its illustrated position, and that the cut-out switch $CO^2$ has been thrown to that shown in dotted lines, cutting out motor No. 2, the circuits will be as follows: Following the lead from armature $A^2$ toward the left, it wil be found to be open-circuited at contact 54 upon cut-out switch $CO^2$. The circuit of this armature will not be further traced, inasmuch as, as before pointed out with reference to armature A', it being open-circuited at one point, no current will flow. The circuit from armature A' is as follows: passing to the lead upon the right-hand side of the armature the current passes to contact 51 upon the cut-out switch CO' to contact $51^b$, by the lead to contact 16 on the switch E, to contact-plate $16^d$, through the blow-out coil E' to contact-plate $17^d$, to contact 17, through the brake-shoe R, to contact 3, to contact-plate $3^d$, through the blow-out coil E', to contact-plate $2^d$, contact 2, to contact $54^b$ upon the cut-out switch $CO^2$, to contact $54^a$ and to the controller-frame. Entering from the controller-frame at the switch E it passes to the contact-plate $15^d$, to contact 15, by the lead through the field-magnet FM', thence to the point 63. Here the current divides, the main circuit being from the point 63, by the lead to the contact 14 upon the switch E, to contact-plate $14^d$, to contact-plate $13^d$, contact 13, and by the lead to the other side of the armature A', thus completing the circuit, as illustrated in Fig. 18, through the brake-shoe and field-magnet, using the controller-frame as part of the circuit. The other path of the current is the shunt containing the resistance, and, as before, is from the controller-frame to the cut-out switch $CO^2$ to the contact $54^a$, by cross-connection to contact $53^a$, by the switch-blade to contact $53^b$, by the lead to the point 64, to contact 5 on the switch E, to contact-plate $5^d$, by cross-connection to contact-plate $6^d$, to contact 6, by the lead to the contact $50^b$ upon the cut-out switch CO', by the switch-blade to contact 50, rejoining the main circuit at the point 63. It will be seen that when the cut-out switches are operated the current will pass in relatively opposite directions through the brake-magnet R as the respective switches are thrown. This has no practical effect upon the braking mechanism as a whole, as its operation is equally effective in whichever direction the current passes. In each of the circuits, as traced through the cut-out switches in their dotted line positions, it will be understood that the shunt is at first a direct short-circuit, as already pointed out with reference to the operation of the braking mechanism when both motors are acting, and that more and more resistance is cut in by the rotation of the switch E and the operation of the contacts 6 7 8, &c., until the shunt is open-circuited and the entire current passes through the field.

It is manifest that changes may be made in the arrangement of circuits and apparatus which I have devised without affecting the application of my invention. So far as I am aware I am the first to utilize the controlling-frame as part of the circuit of an electric-braking mechanism, and as by this step I obtain, as already pointed out, a very considerable economy in installation of apparatus I wish to make broad claims thereto. I am also the first to so combine a plurality of motors and a braking mechanism that the brake will be operative with either one or two motors. I also employ the diagrammatic representation of the brake-shoe R as a convenient way of illustrating either one or a plurality of brake-shoes, as it is manifest that two or more brake-shoes may be employed, either in series or in multiple, or, if there be more than two, in multiple series or in any other combination. I may also employ both the mechanical lock which I have shown and my improved electric lock in the same apparatus, or I may so arrange it that the mechanical lock may be actuated upon the failure of the electric lock, or vice versa, without affecting my invention. All such formal variations I aim to include in the claims appended hereto.

I also wish to claim, broadly, herein the combination of a series-parallel switch and a brake-switch, with contacts upon the brake-switch connecting with the series-parallel switch directly, inasmuch as by this arrangement (as in the case of using the controller-frame as part of the circuit) I save considerable expense in the wiring of the car. Therefore the claims I shall make to the combination of a series-parallel switch and brake-switch, as above pointed out, I wish to be construed broadly.

What I claim as new, and desire to secure by Letters Patent of the United States, is—

1. In an electric braking mechanism, a controlling switch for the electric motors, a brake switch, a reversing switch, and means adapted to prevent a simultaneous operation of any two of the switches.

2. In an electric braking mechanism, a controlling switch, a reversing switch, a brake switch, and means adapted to prevent the operation of the reversing switch and the brake switch while the controlling switch is being operated.

3. In an electric braking mechanism, a controlling switch, a reversing switch, and a brake switch, and means adapted to prevent the operation of the controlling switch and the brake switch while the reversing switch is being operated.

4. In an electric braking mechanism, a controlling switch, a reversing switch, and a brake switch, and means adapted to prevent the operation of the reversing switch and the controlling switch while the brake switch is in operation.

5. In an electric braking mechanism, a reversing switch, a controlling switch and a brake switch, and interlocking mechanism between the reversing switch and one of the other switches, the other switches being connected.

6. In an electric brake, a controlling switch and a brake switch, and means connecting the switches arranged to cause the operation of one of them to always bring the other to the off position before the actuated switch is brought into operative position.

7. In an electric brake, a controlling switch, a brake switch, and gearing connecting the two switches and arranged to always bring one of them to an off position by the operation of the other before the operated switch affects the motor circuits.

8. In an electric brake, a brake switch, fixed contacts co-operating therewith, an idle portion and operative contacts upon the brake switch, a controlling switch similarly provided with fixed contacts, operative contacts, and an idle portion, and connecting mechanism between the two switches; whereby the fixed contacts of one switch are upon the idle portion of that switch while the fixed contacts of the other switch are upon the operative contacts of that switch, and vice versa.

9. In an electric brake, a cylindrical controlling switch having operative contacts and a blank portion upon the cylinder, fixed contacts co-operating with the controlling switch cylinder, a cylindrical brake switch similarly arranged, fixed contacts co-operating therewith, and mechanism adapted to bring the fixed contacts upon one switch over the blank portion of the cylinder when the fixed contacts of the other switch are upon the operative contacts upon its cylinder, and vice versa.

10. In combination, a plurality of switches, and mechanism connecting them adapted to bring part of them to the off position while permitting the further movement of the remainder.

11. In an electric brake, a controlling switch, a brake switch, and co-operating mechanism adapted to bring the controlling switch to rest at its off position while permitting the further rotation of the brake switch.

12. In an electric brake, a controlling switch, a brake switch, and co-operating mechanism adapted to retard the movement of the controlling switch as it approaches the off position while permitting the further movement of the brake switch.

13. In an electric brake, a controlling switch, a brake switch, and co-operating mechanism adapted to progressively retard the movement of the controlling switch as it approaches the off position while permitting the further movement of the brake switch.

14. In an electric brake, a brake switch, a controlling switch, mechanism connecting the two switches, a reversing switch having a handle removable in one position only, and an interlocking mechanism adapted to lock the brake switch and controller by the movement of the reversing switch to the position in which its handle may be removed.

15. In combination, a motor gear-casing, a brake shoe, and means for supporting the brake shoe upon the gear-casing.

16. In combination, a motor gear-casing, a brake shoe, lugs upon the gear-casing, and co-operating parts upon the brake shoe adapted to engage with the lugs.

17. In combination, a motor gear-casing, a brake shoe upon the gear-casing, and springs between the casing and the brake shoe.

18. In combination, a motor gear-casing, a brake shoe, means for supporting the brake shoe upon the casing, and springs connecting the casing and brake shoe at an angle to the plane of the shoe.

19. As a new article of manufacture, a brake shoe for an electric braking mechanism, composed of an iron frame and segmental blocks supported therein provided with coil chambers; the frame being made in portions spaced apart and adapted to engage with supporting means for the shoe.

20. In a braking apparatus and in combination, a rotating disk affixed to the axle of the car, a brake shoe co-operating therewith, and a mechanical clamp or clutch adapted to hold the two in engagement, substantially as described.

21. In combination, a rotating disk affixed to the car axle, an electro-magnetically operated brake shoe, and a clamp or clutch co-operating therewith, arranged to hold the two parts in engagement after the cessation of current.

22. In a braking mechanism and in combination, a rotating disk affixed to the car axle, a brake shoe co-operating therewith, and a clutch comprising a bar having a lug at a right angle thereto, and means adapted to take up the play between the lug and the side of the disk or to release the lug, substantially as described.

23. In combination, a rotating disk affixed to the car axle, a brake shoe, a clamp comprising a bar having a lug at a right angle thereto, means for taking up the play between the lug and the disk or for releasing the lug, a braking switch upon the car, and a connection between the clutch and the switch, whereby the clutch is operated in the last position only of the switch.

24. As a means of providing a magnetic field adapted to extinguish arcs at the contacts of a switch cylinder, a coil connected between two of such contacts, and adapted to polarize the shaft of the cylinder.

25. As a means of providing a magnetic field adapted to extinguish arcs at the contacts of a switch cylinder, a plurality of coils respectively connected between contacts near the ends of the switch cylinder.

26. As a means of providing a magnetic field adapted to extinguish arcs at the contacts of a switch cylinder, a shaft composed of two pieces of iron divided by a piece of non-magnetic metal, and a plurality of coils connected between the contacts on the switch cylinder.

27. As a means of providing a magnetic field adapted to extinguish arcs at the contacts of a switch cylinder, a shaft consisting of two pieces of iron united by a piece of non-magnetic metal, and a coil connected between the contacts of the switch cylinder adapted to magnetize the shaft, thus forming a magnet adapted to extinguish any arc that may be formed.

28. As a means of forming a magnetic field adapted to extinguish arcs at the contacts of a switching mechanism, a magnetic circuit of iron or steel consisting in part of the shaft of the switching mechanism interrupted by a piece of non-magnetic metal, and a coil energizing such circuit.

29. In an electric braking mechanism, the combination of two electric motors, separate retarding means for the wheels, operated by the motors, and means for cutting out either one of the motors while still maintaining the operativeness of the retarding means for the wheels.

30. In combination, in an electric braking mechanism, a plurality of braking-magnets and two electric motors with cut-out switches adapted to cut out either one of the motors and leave all of the brake magnets in circuit with the other motor.

31. In an electric braking mechanism, a plurality of electric motors and a plurality of brake-magnets; in combination with cut-out switches adapted to remove a part of the motors from the circuit, leaving the rest of the motors in circuit with the brake-magnets.

32. In an electric braking mechanism, electric motors, brake-magnets, and connections between the two; in combination with switching mechanism provided with a frame, such frame forming part of the circuit between the motors, the switch, and the brake-magnets.

33. In combination, a controlling switch having an off position, a brake switch having an off position, a reversing switch having an intermediate position in which position only its handle is removable, and interlocking mechanism between the three switches whereby the brake switch and controlling switch are locked in their off positions when the reversing switch is in the position in which its handle may be removed.

34. In a locking mechanism for an electric brake, a rotating disk fast to the axle of the car, a brake-shoe co-operating therewith, a bar spanning the two and having a removable lug adapted to engage the outer surface of disk, and means for taking up the play between the lug and the disk when the shoe and the disk are in engagement.

35. The means for locking a braking mechanism herein set out, consisting of a bar provided with a lug, means arranged to take up the play of the lug, and springs adapted to restore the lug to its central position when released.

36. The means for locking a braking mechanism herein set out, consisting of a bar provided with a lug at right angles thereto, an eccentric arranged to take up the play of the lug, and springs adapted to restore the lug to its central position when released.

37. The means, herein set out, for locking two opposing surfaces together, consisting of a bar provided with a lug at an angle thereto, an eccentric adapted to take up the play between the bar and one of the opposing surfaces when they are brought into contact, and leaf springs attached to the bar, bearing against suitable abutments or pins and adapted to return the bar to a central position upon its release, substantially as described.

38. In combination, an electric motor, a car axle geared to the motor, a disk fast to the car axle, and a brake-shoe co-operating with the disk, the brake-shoe being suspended upon a part of the motor.

39. In combination, an electric motor, a car axle geared thereto, a disk fast to the car axle, a brake-shoe co-operating with the disk, and a locking mechanism adapted to maintain the engagement of the brake-shoe and disk after the cessation of current.

40. In combination, an electric braking apparatus, and a mechanical lock for such apparatus controlled by the last movement only of the brake switch.

41. In combination, an electric braking apparatus and a mechanical lock for such apparatus controlled by the last normal movement only of the brake switch.

42. In combination, an electric motor, a car axle geared thereto, a disk fast to the car axle, a brake-shoe co-operating with the disk, a controlling mechanism for the brake, and a lock or clamp adapted to be put on by the last motion of the controlling mechanism after the shoe and disk are in engagement.

43. In combination, a series-parallel controller, a reversing switch and a brake switch, and interlocking mechanism preventing the simultaneous operation of any two of the switches.

44. In an electric braking apparatus, a rotary cylindrical switch having a shaft of magnetic material, and coils adapted to energize the shaft.

45. An interlocking mechanism for electric switches, substantially as described, comprising a bolt, as L, registering with a notch upon one of the switches, pawls, as $i^2$, $K^2$, connected to the bolt by pins and slots, and cams upon two of the switches co-operating with the pawls, one of the cams having a projection adapted to prevent the motion of the pawl upon the other cam when the first cam is rotated.

In witness whereof I have hereunto set my hand this 17th day of January, 1895.

WILLIAM B. POTTER.

Witnesses:
B. B. HULL,
A. F. MACDONALD.